Patented Mar. 25, 1947

2,418,028

UNITED STATES PATENT OFFICE 2,418,028

CONDENSATION OF HYDROCARBONS

Vladimir Haensel, Riverside, Ill., assignor to Universal Oil Products Company, Chicago, Ill., a corporation of Delaware No Drawing. Application April 29, 1944, Serial No. 533,391

4 Claims. (Cl. 260—671)

1

This invention relates to the condensation of hydrocarbons and is more specifically concerned with a method for improving the selectivity and increasing the active life of natural and synthetic prepared catalysts employed in this type of reaction.

The hydrocarbon conversion reactions to which the present invention is applicable include such processes as polymerization of olefinic hydrocarbons to form higher boiling polymers, the alkylation of aromatic hydrocarbons with olefins to form alkyl aromatic derivatives, and the alkylation of isoparaffinic hydrocarbons such as isobutane, isopentane, isohexanes, etc., with olefins to form higher boiling alkymers.

The process of catalytically polymerizing olefinic hydrocarbons has been extensively employed in the manufacture of high quality motor fuel, for example, gasoline fractions having very desirable antiknock properties, are obtained by polymerizing butylenes, propylene or mixtures thereof to form polymers which are subsequently hydrogenated thereby forming saturated isooctanes, etc., which may be employed in motor fuels to raise the antiknock value thereof.

One of the more recent developments of the motor fuel industry has been the catalytic alkylation of isoparaffins or aromatics with alkylating agents such as olefins, alcohols, etc., to form products having superior antiknock properties. These materials have been extensively used as blending agents in the production of gasoline blends which are employed as fuel for aviation engines. Further, the alkylation of aromatics such as benzene with an olefin such as ethylene has been utilized to a great extent in recent years to produce ethylbenzene which is readily dehydrogenated to styrene. The latter hydrocarbon is extensively employed in the manufacture of synthetic rubber.

Associations of refractory metal oxides such as clays, either with or without acid treatment, or synthetically prepared composites of refractory metal oxides such as alumina, silica, zirconia, thoria, etc., have been previously employed to accelerate the condensation reactions heretofore set forth. The commercial utility of these catalysts is somewhat limited due to the fact that these catalysts rapidly lose their activity during the processing operation. This rapid loss in activity necessitates frequent regeneration and in some cases replacement of the catalyst, thereby causing periodic interruptions of the operation. Various complicated schemes have been proposed to eliminate these periodic interruptions and to obtain an operation more closely approaching a truly continuous operation. These schemes ordinarily employ a plurality of reactors having fixed beds of catalysts disposed therein, said catalyst being alternately contacted with the hydrocarbon reactants and regenerating medium. By staggering the various processing cycles a substantially constant production of the product may be obtained.

It is an object of this invention to provide a method for maintaining the catalyst activity over longer periods of use and as a result decrease the frequency of the regenerating treatment.

In conducting the various condensation reactions it is difficult to limit the reactions to the specific one desired. Various side reactions occur simultaneously which tend to decrease the total overall yield of the desired product. This is particularly true, for example, with the alkylation of aromatic hydrocarbons or other cyclic hydrocarbons with olefins. As a result, minor quantities of polyalkylated materials are obtained thereby decreasing the yield of the desired monoalkylated compound. The addition of an organic acid during the conversion reaction not only aids in maintaining the catalyst activity but also appears to effect a considerable influence on the selectivity of the catalyst.

In one embodiment the present invention consists of a process for condensing hydrocarbons by subjecting said hydrocarbons under condensation conditions to the action of a catalyst comprising an association of the refractory oxides of at least two elements selected from the group consisting of aluminum, silicon, magnesium, thorium and boron in the presence of a relatively small quantity of an organic acid.

Organic acids which are included within the broad scope of this invention are such acids as formic, acetic, oxalic and similar types of organic acids. These acids may be introduced into the reaction zone in any suitable manner. A simple method is the direct addition of the acid either continuously or intermittently to the fresh feed being charged to the process. Another method consists of adding small portions of the acid into one or all of the various recycle streams in the process. Ordinarily acid concentrations of less than 5 volume percent of the charge and preferably less than 1 volume percent of the charge are sufficient to produce the desired reactions.

The catalyst which may be employed in accordance with the present invention include associations of refractory oxides of at least two elements selected from the group consisting of aluminum, zirconium, magnesium, silicon, thorium and boron. Included in this broad classification are natural occurring associations of the oxides of silicon and aluminum such as montmorillnite, bentonite, kaolinite clays and synthetically prepared composites of silica and alumina, silica and zirconia, alumina and boria, silica and magnesia, etc.

Synthetic catalysts and particularly those comprising associations of silica with at least one other refractory oxide may be prepared by separately forming hydrogels and compositing these hydrogels in the desired proportions, or they may be formed by preparing a single hydrogel, for example, silica hydrogel, and incorporating the other refractory oxides thereon by contacting said hydrogel with a solution of a soluble salt followed by the precipitation of the hydrated oxide and drying and calcining the mass to form an association of refractory oxides. Alternatively, a purified silica hydrogel may be formed and contacted with a decomposable salt, for example, aluminum nitrate or zirconium nitrate, followed by heating to decompose the nitrate thereby forming the oxide.

The synthetic catalyst may be also prepared by simultaneously precipitating the hydrogels of two or more of the refractory oxides followed by drying and calcining to form the desired catalyst composite.

The following method of catalyst preparation is illustrative of the methods which may be employed to produce suitable catalysts for the condensation reactions. A silica hydrogel formed by mixing a solution of a soluble silicate with an acid is purified by washing with acidified water or solutions of aluminum salts or multivalent salts to effect a displacement of the alkali metal ions. The purified hydrogel is contacted with a solution of a soluble aluminum salt from which alumina is precipitated by the addition of a volatile basic precipitant such as ammonium hydroxide or ammonium carbonate. The resulting composite is dried and calcined to form the final catalyst.

It is not intended that the catalytic materials mentioned herein be considered equivalent in their ability to accelerate the desired condensation reactions. The activity of these catalysts will be somewhat dependent upon their composition and the specific type of condensation reaction in which they are utilized.

The operating conditions such as temperatures, pressures and hourly liquid space velocities which may be satisfactorily employed fall within the following generally broad ranges. The particular temperature, pressure and space velocity selected for any operation will be dependent to a certain extent upon the catalyst employed and the reaction desired. For polymerization reactions, temperatures of about 150 to 450° F., pressures from atmospheric up to 1000 pounds or more, and space velocities within the range of 0.1 to 5 measured as volume of charge per volume of catalyst per hour have been found satisfactory.

For alkylation reaction the temperature range is somewhat higher being about 250 to about 650° F. The pressure range is similar to that shown for polymerization. The space velocity may be varied from 0.5 to about 10 and preferably about 1 to about 5.

In accordance with the present invention the catalyst may be conveniently utilized as filling material in tubes or chambers in the form of small pellets or granules in fixed bed relationship to the incoming reactants or in finely divided state in a "fluidized" or "compact bed" type of operation.

In the "fluidized" operation the charge is passed upwardly through a body of finely divided catalysts causing the catalyst particles to be motionalized and forming a fluid-like mass. The catalyst is continuously withdrawn from the reaction zone, regenerated and returned thereto.

In the "moving bed" type of operation, the compact bed may be continuously passed through the reaction zone concurrently or countercurrently to the incoming reactants and passed therefrom into a regeneration zone from which it is returned to the reaction zone after having been regenerated by the composition of the carbonaceous materials deposited thereon during the conversion reaction.

The following example is typical of the results obtained in operation in accordance with the process of this invention. However, it is not intended that the broad invention be limited in any manner to the specific conditions of operation given in the example.

Example

In this example benzene was alkylated with ethylene using an active natural clay catalyst. For comparative purposes a second run was made using a fresh batch of the same catalyst and substantially the same operating conditions but with 1% by volume of acetic acid added to the charging stock. The operating conditions and the results obtained are given in the table shown below:

| Run Number | 1 | 2 |
| --- | --- | --- |
| Catalyst Mid. Pt. Temp., ° F | 470 | 460 |
| Pressure, p. s. i. | 820 | 750 |
| Benzene, HLSV | 1.57 | 1.54 |
| Benzene: Ethylene Ratio | 3.3 | 2.8 |
| Duration of Run, Hours | 1.0 | 2.0 |
| Product Distribution, % by Wt.: | | |
| Benzene | 76.4 | 75.4 |
| Ethylbenzene | 15.9 | 17.5 |
| Diethylbenzene | 4.5 | 4.6 |
| Polyethylbenzene | 3.2 | 2.5 |
| Ethylene Reacted, % | 81 | 68 |
| Ratio Ethylbenzene / Higher Ethylbenzenes | 2.1 | 2.5 |

The catalyst in run 1 of the example rapidly lost activity. Evidence of this loss of activity occurring after fifteen minutes of operation. The catalyst in run 2 did not show any loss in activity after two hours of operation. Further, it will be noted from the results given above that the addition of acetic acid tended to produce a catalyst having more selectivity. This is apparent by comparing the respective amounts of monoethylated benzenes produced in each run.

I claim as my invention:

1. A process for alkylating an alkylatable hydrocarbon which comprises subjecting said hydrocarbon and an olefin under alkylating conditions to the action of a catalyst comprising an association of refractory oxides of at least two elements selected from the group consisting of silicon, aluminum, zirconium, magnesium, thorium and boron in the presence of a minor amount of an organic carboxylic acid consisting of carbon, hydrogen and oxygen.

2. A process for alkylating an aromatic hydrocarbon with an olefin which comprises subjecting a mixture of an aromatic and an olefin under alkylating conditions to the action of a catalyst comprising an association of refractory oxides of at least two elements selected from the group consisting of silicon, aluminum, zirconium, magnesium, thorium and boron in the presence of a minor amount of an organic carboxylic acid consisting of carbon, hydrogen and oxygen.

3. A process for alkylating an isoparaffin with an olefin which comprises subjecting a mixture of an isoparaffin and an olefin under alkylating conditions to the action of a catalyst comprising an association of refractory oxides of at least two elements selected from the group consisting of silicon, aluminum, zirconium, magnesium, thorium and boron in the presence of a minor amount of an organic carboxylic acid consisting of carbon, hydrogen and oxygen.

4. A process for alkylating an aromatic hydrocarbon with an olefin which comprises subjecting a mixture of an aromatic and an olefin to contact at a temperature within the range of about 250 to about 650° F. and under superatmospheric pressure to the action of a catalyst comprising an association of refractory oxides of at least two elements selected from the group consisting of silicon, aluminum, zirconium, magnesium, thorium and boron in the presence of a minor amount of $CH_3COOH$.

VLADIMIR HAENSEL.

REFERENCES CITED

The following references are of record in the file of this patent:

UNITED STATES PATENTS

| Number | Name | Date |
| --- | --- | --- |
| 2,181,640 | Deanesly et al. | Nov. 28, 1939 |
| 2,188,638 | Atwell | Jan. 30, 1940 |
| 2,326,586 | Vesterdal | Aug. 10, 1943 |
| 1,908,190 | Schollkopf | May 9, 1933 |
| 2,361,355 | Sachanen et al. | May 20, 1941 |

FOREIGN PATENTS

| Number | Country | Date |
| --- | --- | --- |
| 327,382 | I. G. British | Mar. 28, 1930 |